United States Patent
Burns et al.

(10) Patent No.: US 6,594,096 B2
(45) Date of Patent: Jul. 15, 2003

(54) CONFIGURATION OF CHANNEL-TO-CONTROLLER INTERFACE IN A DISC DRIVE

(75) Inventors: Kenneth R. Burns, Bloomington, MN (US); Srinivas Maddali, Scotts Valley, CA (US); Jimmie Ray Shaver, Yukon, OK (US); Bernardo Rub, Sudbury, MA (US); Peter I. Vasiliev, Cupertino, CA (US); Wuping Chen, San Jose, CA (US); Kavi Alptekin, Santa Cruz, CA (US); Gary W. Reininga, Saratoga, CA (US); Robert D. Cronch, Edmond, OK (US); Clifton J. Williamson, Soquel, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 73 days.

(21) Appl. No.: 09/894,981

(22) Filed: Jun. 28, 2001

(65) Prior Publication Data
US 2002/0021516 A1 Feb. 21, 2002

Related U.S. Application Data

(60) Provisional application No. 60/215,352, filed on Jun. 30, 2000, provisional application No. 60/215,355, filed on Jun. 30, 2000, provisional application No. 60/215,356, filed on Jun. 30, 2000, provisional application No. 60/215,353, filed on Jun. 30, 2000, provisional application No. 60/215,354, filed on Jun. 30, 2000, and provisional application No. 60/225,257, filed on Aug. 15, 2000.

(51) Int. Cl.$^7$ .................................................. G11B 5/09
(52) U.S. Cl. ........................................ 360/46; 360/51
(58) Field of Search ................. 360/51, 46; G11B 5/09

(56) References Cited

U.S. PATENT DOCUMENTS

| | | | |
|---|---|---|---|
| 5,278,702 A | 1/1994 | Wilson et al. | 360/51 |
| 5,325,238 A | 6/1994 | Stebbings et al. | 360/15 |
| 6,009,549 A | 12/1999 | Bliss et al. | 714/769 |
| 6,181,655 B1 | 1/2001 | Gushima | 369/50 |
| 6,219,729 B1 * | 4/2001 | Keats et al. | 710/58 |
| 6,275,346 B1 | 8/2001 | Kim et al. | 360/31 |
| 6,317,856 B1 | 11/2001 | Fredrickson et al. | 714/755 |
| 6,411,452 B1 * | 6/2002 | Cloke | 360/51 |

FOREIGN PATENT DOCUMENTS

EP  0 555 832 B1  10/1993

* cited by examiner

Primary Examiner—David Hudspeth
Assistant Examiner—Dan I. Davidson
(74) Attorney, Agent, or Firm—Joseph R. Kelly; Westman, Champlin & Kelly, P.A.

(57) ABSTRACT

Embodiments of the present invention illustrate various configurations of a channel-to-controller interface. In one embodiment, width of symbols crossing the interface is fixed, as is the clock rate. In other embodiments, the symbol width is variable, and the clock rate is also varied based upon the size of the interface symbol width and the operation of the channel.

17 Claims, 9 Drawing Sheets

CONFIGURATION OF CHANNEL-TO-CONTROLLER INTERFACE IN A DISC DRIVE

CROSS-REFERENCE TO RELATED APPLICATION

Reference is hereby made to, and priority is hereby claimed from U.S. provisional patent application serial nos. 60/215,352, filed Jun. 30, 2000, entitled LONG LATENCY R/W CHANNEL TO CONTROLLER INTERFACE BUS AND CLOCKING Configuration 1; 60/215,355, filed Jun. 30, 2000, entitled LONG LATENCY R/W CHANNEL TO CONTROLLER INTERFACE BUS AND CLOCKING Configuration 2; 60/215,356, filed Jun. 30, 2000, entitled LONG LATENCY R/W CHANNEL TO CONTROLLER INTERFACE BUS AND CLOCKING Configuration 3; 60/215,353, filed Jun. 30, 2000, entitled LONG LATENCY R/W CHANNEL TO CONTROLLER INTERFACE BUS AND CLOCKING Configuration 4; 60/215,354, filed Jun. 30, 2000, entitled LONG LATENCY R/W CHANNEL TO CONTROLLER INTERFACE BUS AND CLOCKING Configuration 5; 60/225,257, filed Aug. 15, 2000, entitled LONG LATENCY R/W CHANNEL TO CONTROLLER INTERFACE BUS AND CLOCKING Configuration 6.

FIELD OF THE INVENTION

The present invention relates to disc drives. More specifically, the present invention relates to a configuration for a channel-to-controller interface in the disc drive.

BACKGROUND OF THE INVENTION

A typical disc drive includes one or more discs mounted for rotation on a hub or spindle. A typical disc drive also includes one or more transducers supported relative to surfaces of the discs in the disc drive to read information from, and write information to, the discs. The transducers along with any air bearings associated therewith are collectively referred to as a data head. A drive controller is conventionally used for controlling the disc drive system based on commands received from a host system. The drive controller controls the disc drive to retrieve information from the disc and to store information on the disc.

An actuator operates within a servo system and typically includes an actuator arm that supports a flexure or flexure assembly which, in turn, supports the data head. The actuator moves the data head radially over the disc surface for track seek operations and holds the transducer directly over a track on the disc surface for track following operations.

Information is typically stored on the discs by providing a write signal to the data head to encode information on the surface of the disc representing the data to be stored. In retrieving data from the disc, the drive controller controls the actuator so that the data head flies above the disc, sensing the information on the disc, and generating a read signal based on that information. The read signal is then decoded by the drive electronics to recover the data represented by the information stored on the disc, and consequently represented in the read signal provided by the data head.

In conventional disc drives, user information is provided from a host to a controller circuit where it is stored as bits in a cache buffer. The data are formatted, appended with error correction and detection information and provided to a read/write channel that encodes the data and writes it to the media. During a read operation, the signal stream from the disc is inverse transformed back to user information through a separate read path, some of which resides in the read/write channel circuit and some of which resides in the controller.

All circuits are clocked synchronously such that the data rate at any point in the data path from the input buffer in the controller to the media is a direct transform of the user data rate. Each circuit adds a small delay or latency such that the write data bytes leaving the cache buffer arrive on the disc after a transformation several bit intervals later. The read circuit detection and inverse transformations also add a small delay, usually longer than the write circuit delay, from the disc signal through the read path to the cache buffer.

Future detection and transformation methods will add complexity to the system in an attempt to allow higher areal density of information to be stored on the disc surface. However, the read and write path delays will no longer be small.

Specifically, for example, read path delays with iterative decoding channels can be less than, equal to, or longer than a sector time, where a sector is a minimum unit of user information stored as a separate entity on the disc. Currently, the path delay occurs between sectors. For example, the read decoding path delay occurs during the intersector gap field, and the write encoding path delay occurs during the preamble field. However, as the path delay increases, the unused portion of disc space between sectors increases, resulting in wasted storage space.

To address this deficiency, long latency interfaces decouple the data transfer from the controller circuit to the read/write channel circuit (or between the controller and read/write channel functions if they are implemented on a single physical integrated circuit chip) from the data transfer between the read/write channel circuit (or function) and the disc media. The clocking and data bus requirements of long latency interfaces are different than those for traditional channel-to-controller interfaces and must address many different timing issues.

Embodiments of the present invention address one or more of these and other problems and offer advantages over the prior art.

SUMMARY OF THE INVENTION

Embodiments of the present invention illustrate various configurations of the channel-to-controller interface. In one embodiment, width of symbols crossing the interface is fixed, as is the clock rate. In other embodiments, the symbol width is variable, and the clock rate is also varied based upon the size of the interface symbol width and the operation of the channel.

For example, in one embodiment, the symbol width varies based upon the user bit width and based upon the particular functions located in the controller. In other embodiments, the symbol width is set at a fixed bit width, or is fixed at a size based on the particular error correction code symbol width (such as the Reed Solomon code symbol width).

The clock can also be variable and can be based on the number of bits in the user data, the number of bits in the error correction code symbol, the number of bits in the interface symbol, or based on the media clocking speed. Of course, the clock period in these embodiments can be varied as well to accommodate the addition or subtraction of bits by the various functional blocks used in transforming the data in the controller and channel.

BRIEF DESCRIPTION OF THE DRAWINGS

FIGS. 2-1 and 2-2 illustrate the format of a disc track.

FIGS. 5 and 6 illustrate a block diagram of a disc drive controller and read/write channel, and a plurality of clock signals, respectively, for various configurations of the channel-to-controller interface.

DETAILED DESCRIPTION OF ILLUSTRATIVE EMBODIMENTS

Figure 1:
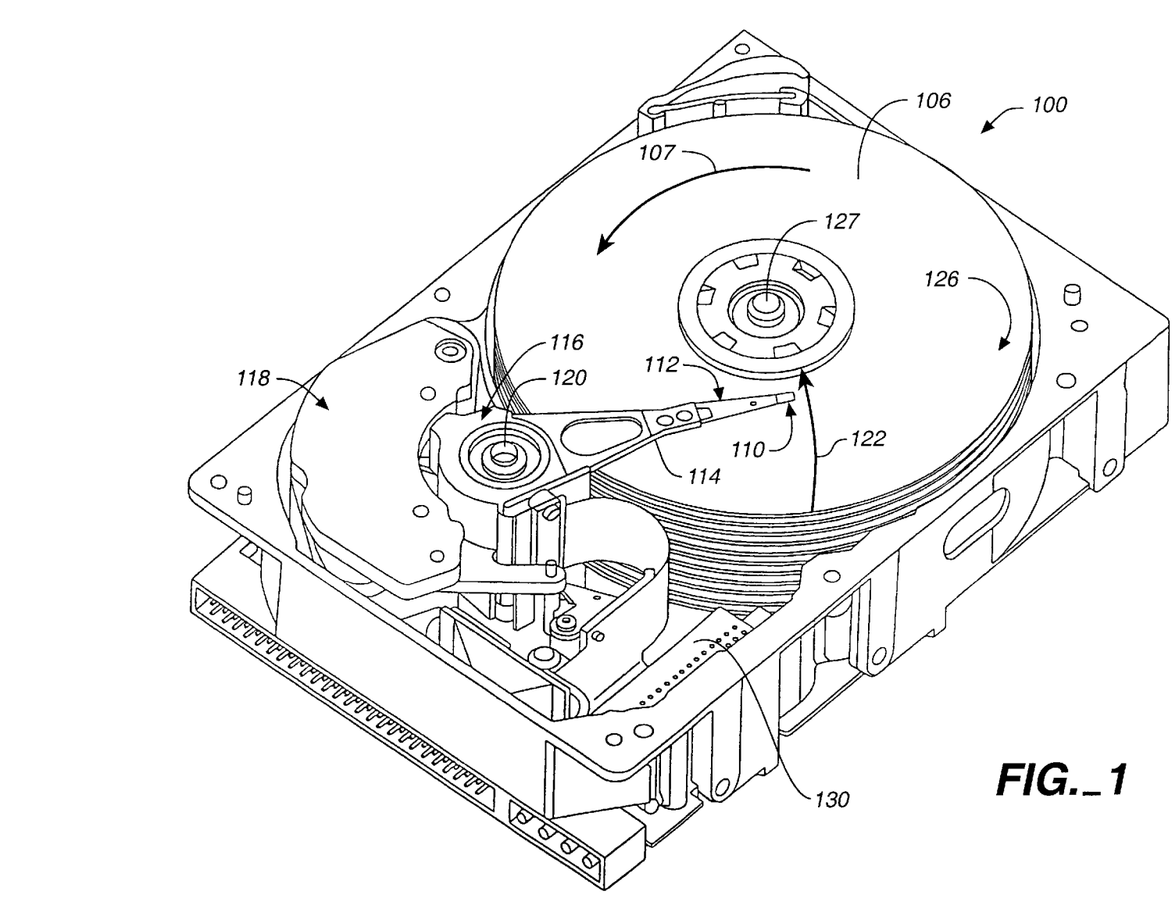
FIG. 1 illustrates a disc drive in accordance with one embodiment of the present invention.

FIG. 1 illustrates an embodiment of a disc drive storage device 100. Disc drive 100 includes a disc pack 126 having storage surfaces 106 that are illustratively layers of material (such as magnetic material or optically readable material). The disc pack 126 includes a stack of multiple discs each accessible by a read/write assembly 112 which includes a transducer or head 110. A spindle motor 127 drives rotation of the discs in disc pack 126 in a direction such as that shown by arrow 107. As discs 126 are rotated, read/write assembly 112 accesses different rotational locations on the storage surfaces 106 in disc pack 126. Read/write assembly 112 is actuated for radial movement relative to the disc surfaces, such as in a direction indicated by arrow 122, in order to access different tracks (or radial positions) on the disc surfaces. Such actuation of read/write assembly 112 is illustratively provided by a servo system which includes a voice coil motor (VCM) 118. Voice coil motor 118 includes a rotor 116 that pivots on axis 120. VCM 118 also illustratively includes an arm 114 that supports the read/write head assembly 112.

Disc drive 100 illustratively includes control circuitry 130 for controlling operation of disc drive 100 and for transferring data in and out of the disc drive 100.

Figure 21:
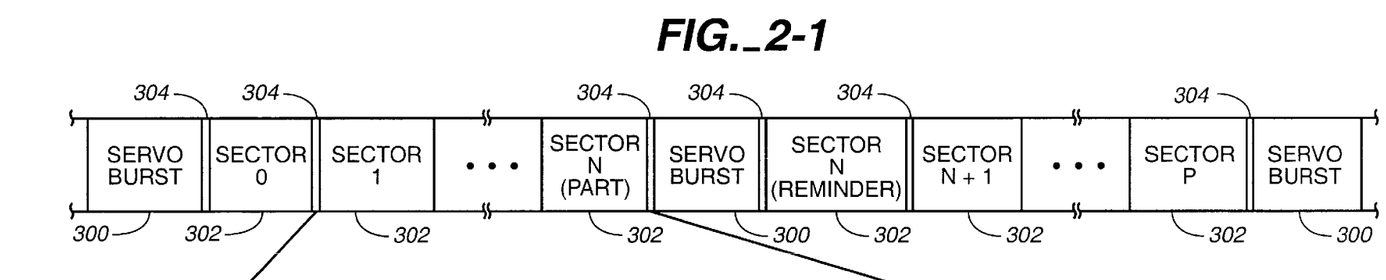

FIGS. 2-1 and 2-2 illustrate the format of a data track on one of discs 106. FIG. 2-1 is a view of part of a data track. The data track includes a plurality of servo bursts 300 distributed therethrough. Between the servo bursts, a plurality of sectors 302 are located. It should also be noted that sectors 302 can be split on either side of servo bursts 300. Gaps 304 illustratively separate the servo bursts from the sectors, and the sectors from one another.

Figure 22:
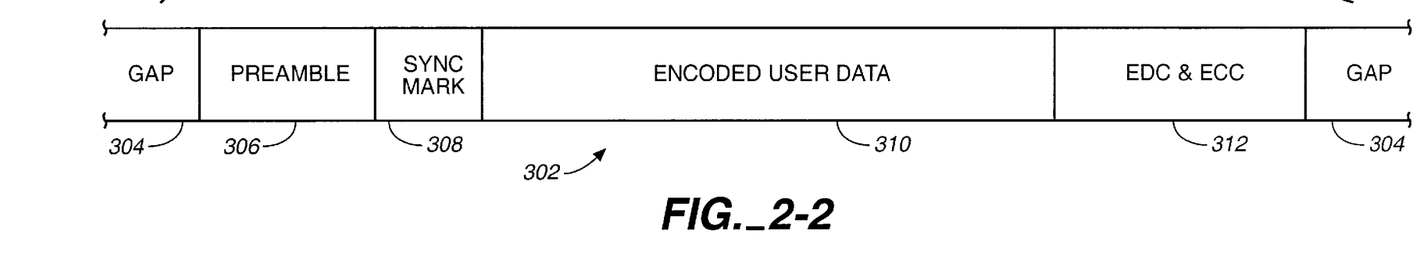

FIG. 2-2 illustrates a single sector 302 in greater detail. Sector 302 includes a preamble portion 306, a sync mark 308, an encoded user data field 310, and an EDC and ECC (error detection code and error correction code) field 312. The preamble 306 is illustratively a phase locked loop field that allows a phase locked oscillator to lock on to the signal recorded on the disc. Sync mark 308 indicates the end of preamble 306 and the start of encoded user data 310. The user data are encoded according to various code constraints (such as run length codes, etc.) and the encoded data are written on the disc in field 310. The error detection and error correction code information is appended to the user data and is written in field 312.

Figure 3:
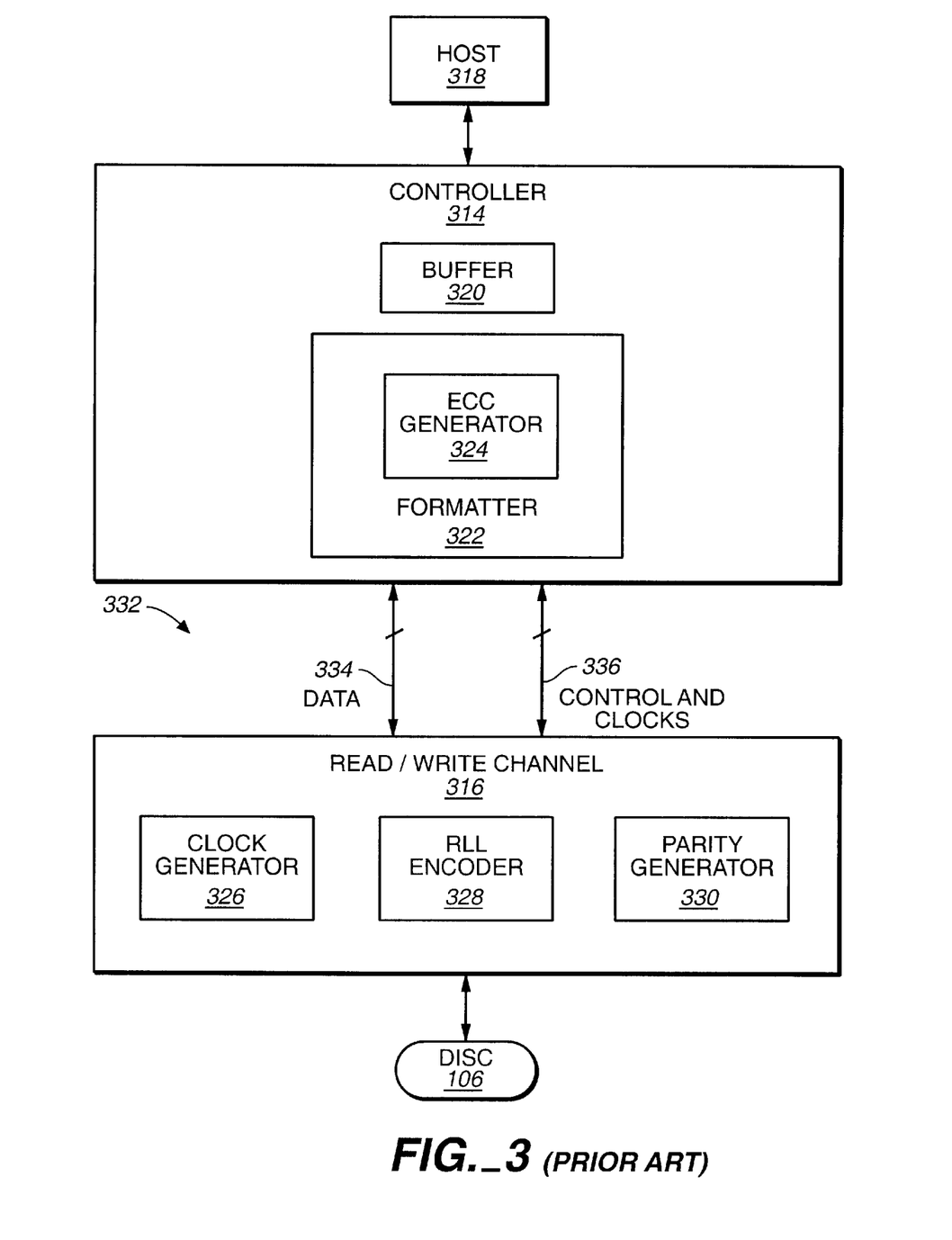
FIG. 3 is a block diagram illustrating a conventional disc drive controller and read/write channel.

FIG. 3 is a block diagram of a prior art disc drive controller 314 and read/write channel circuit 316 positioned between a host computer 318 and one of disc surfaces 106 in disc pack 126. Controller 314 includes a data buffer 320 and a formatter 322 which has included ECC generator 324. The read/write channel circuit 316 includes clock generator circuit 326, run length limit encoder 328 and parity generator 330.

In operation, user data are provided from host 318 to buffer 320. Formatter 322 retrieves the data from buffer 320, computes the EDC and ECC information, appends it to the user data, and transfers the user data and EDC/ECC data across the channel-to-controller interface 332 to read/write channel 316. In preparing the data for transfer across interface 332, formatter 322 packages the data so it can be laid down on the media according to the particular desired format, such as that shown in FIGS. 2-1 and 2-2. Once the data are transferred across interface 332 to read/write channel 316, the data are encoded by RLL encoder 320 and parity information is generated by parity generator 330, and the data are written to disc media 106.

Interface 332 illustratively includes data signals 334 and control signals 336. In one illustrative embodiment, the control signals include a clock signal which is generated by clock generator circuit 326 and is illustratively coupled to the speed at which serial data are clocked to and from (i.e., written to and read from) disc media 106. Control signals 336 also illustratively include other control signals for controlling reading and writing data from and to disc media 106. Such signals illustratively include a Read Gate signal, a Write Gate signal, and possibly a Sync Found signal. In one embodiment, the Clock signal and the Data signals are used for transferring data back and forth between controller 314 and read/write channel 316. The Clock signal, the Write Gate signal, the Read Gate signal, and possibly the Sync Found signal are used for transferring data between read/write channel 316 and disc media 106.

In the prior art embodiment illustrated in FIG. 3, the data pipeline in read/write channel 316 is of a substantially fixed length, and the data moves through the pipeline at the same rate that it is clocked across the data interface 332. Therefore, during a write operation, data is retrieved from buffer 320, formatted by formatter 322 to correspond to the desired track format timing (such as that illustrated in FIGS. 2-1 and 2-2), clocked across interface 332, encoded, and written to disc 106 by read/write channel 316. This data transfer and encoding sequence happens in a synchronized fashion, with relatively small delays or latencies associated with each block in the processing stream. During a read operation, the signal stream from the disc is transformed back into user information through read/write channel 316, interface 332 and controller 314 in a synchronized fashion, with short latencies possibly different than those of the write operation.

Figure 4:
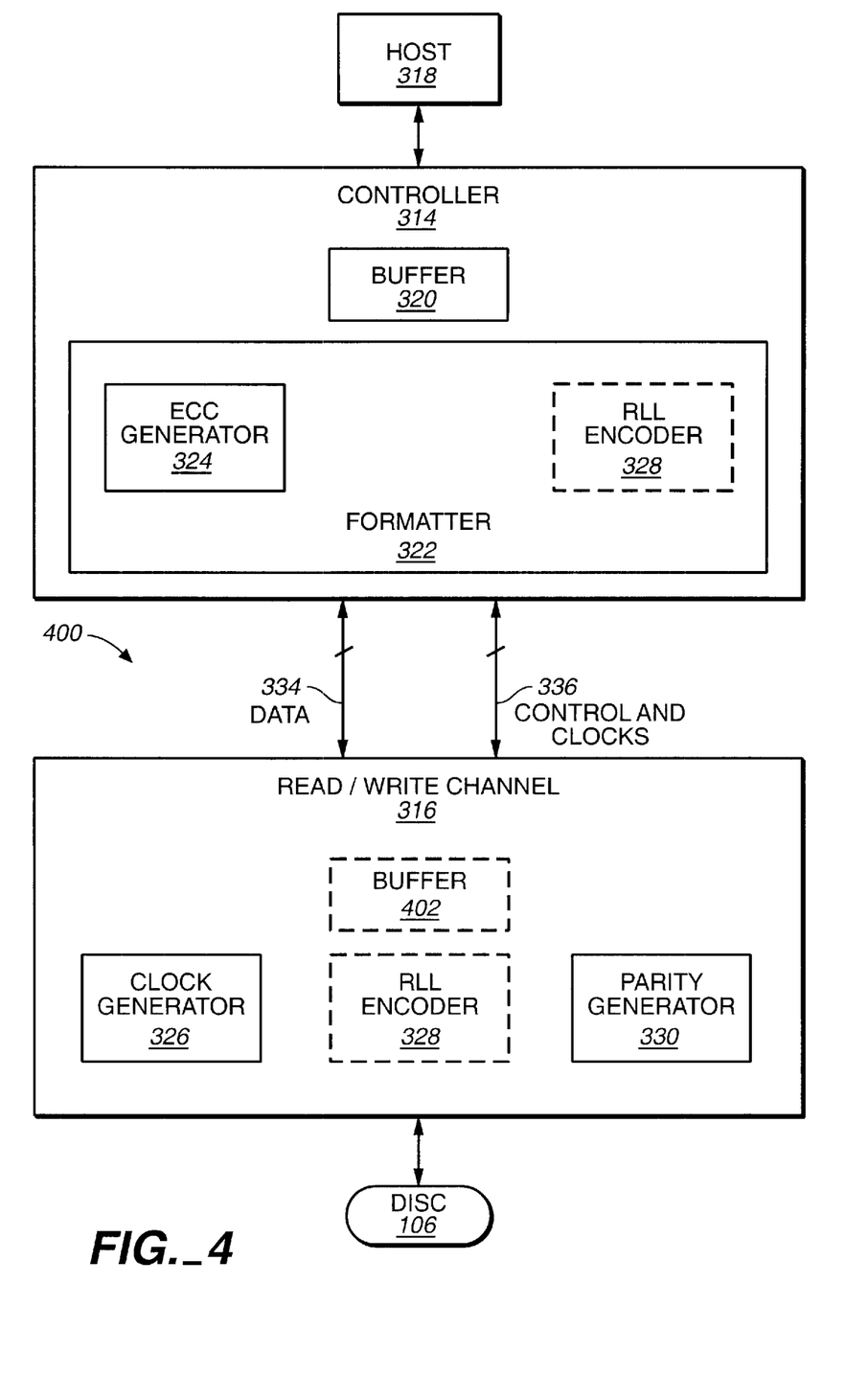
FIG. 4 is a block diagram illustrating a disc drive controller and read/write channel having functions variously distributed throughout.

FIG. 4 is a block diagram of a portion of a long latency interface 400. A number of the items are similarly numbered to those shown in FIG. 3. However, long latency interface 400 supports read/write channel 316 which includes a large channel data buffer 402. Since both controller 314 and read/write channel 316 include buffers (320 and 402), long latency interface 400 allows independent channel-to-controller interface and channel-to-media data transfers at possibly different rates, and includes a data throttling mechanism other than the clock cadences (i.e., it includes buffer 402).

Long latency interface 400 can also illustratively operate in a plurality of different modes. The long latency interface mode has two subsets, one being a direct mode and the other being a permuted mode. In the direct long latency interface mode, the ECC function is performed by ECC generator 324, located in formatter 322 which itself resides in controller 314, while the run length encoding function is performed by RLL encoder 328 which is located in read/write channel 316. In the permuted mode, both the RLL and ECC functions (and the corresponding ECC generator 324 and RLL encoder 328) are located in, and performed at, controller 314. Showing RLL encoder 328 and phantom in FIG. 4 illustrates that it can be located in either controller 314 or read/write channel 316, depending on the particular mode of operation.

A backward compatibility mode allows operation of controller 314 with traditional, non-long latency interface channels. There are two subsets of this mode as well: the direct mode and the permuted mode. These subsets are the same as the direct and permuted subsets discussed in the preceding paragraph.

In a native mode of operation, it is assumed that the interface is a long latency interface with permuted RLL/ECC. It is also assumed that the RLL and channel word lengths are independent of one another. This leads to one additional definition. The term channel word, in this sense, refers to the minimum increment number of bits operated on by the iterative or parity code generator in channel 316. It is assumed that the iterative codes will have a large code word composed of an integral multiple of the this minimum increment.

The present invention includes various embodiments or configurations of interface 400 for enhancing operation in one or more of these modes.

Figure 5:
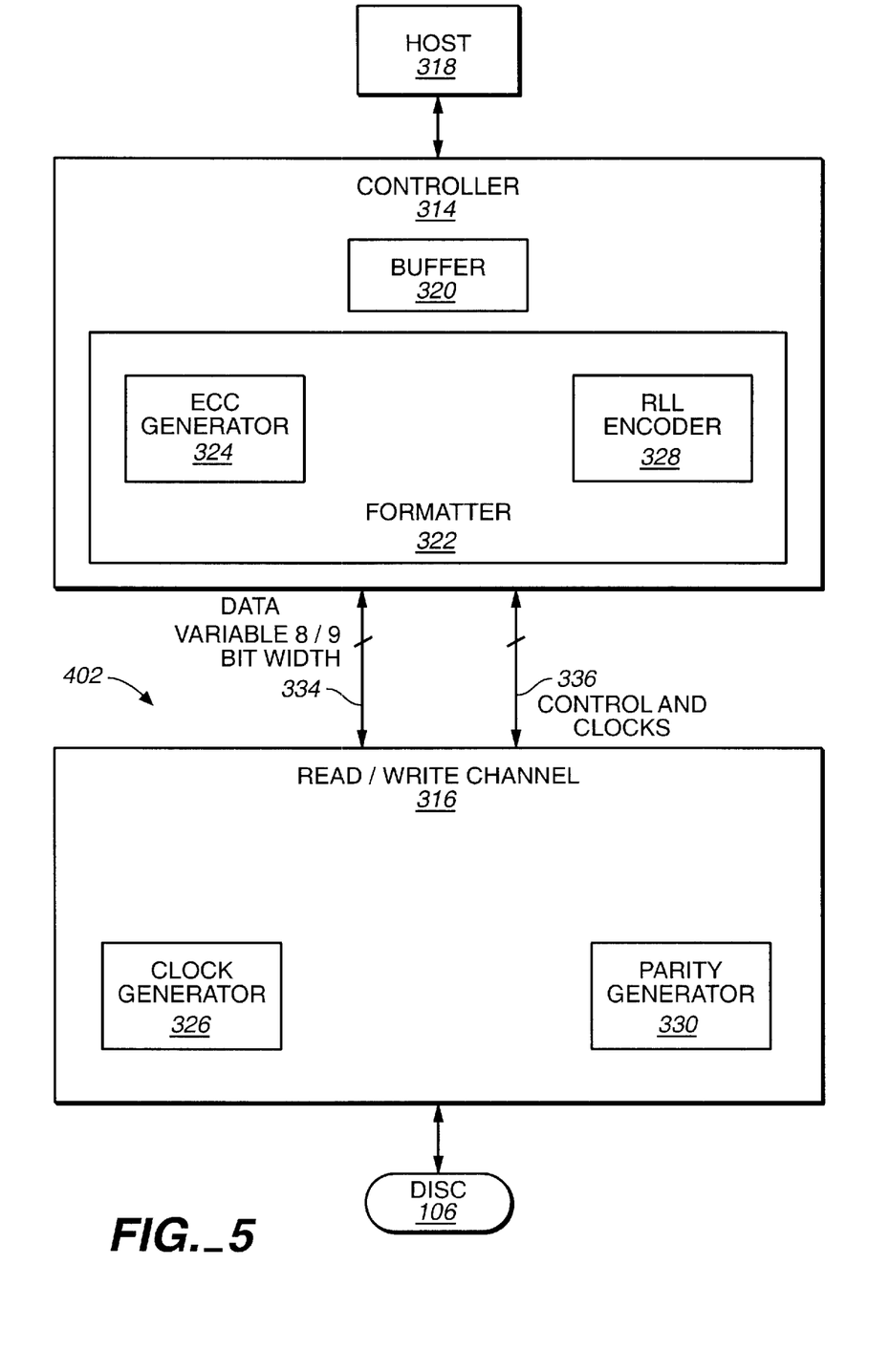

FIG. 5 illustrates a first such configuration. In FIG. 5, RLL encoder 328 is located in formatter 322 in controller 314. The data bus 334 varies in size, illustratively between 8 and 9 bits, during the data transfer operation. The physical size of the data bus is illustratively the largest size of the variation (e.g., 9 bits wide). It should also be noted that if the RLL encoder 328 is located in read/write channel 316, then the data bus 334 can be fixed at 8 bits.

The interface clock is sourced by clock generator 326 in read/write circuit 316 for both read and write operations. The interface clock illustratively has a period which corresponds to the period of either 8 channel bits (8 clock periods used to clock 8 bits of serial data from the read/write channel 316 out to disc media 106) or more channel bits. The base period of the clock is illustratively 8 channel bits, and the period is stretched by one channel bit for each cycle that the interface symbol width is 9 bits (i.e., for each cycle that 9 bits are transferred across the data bus), and by one channel bit for each channel parity bit inserted or removed in the signal path by parity generator 330 in read/write channel 316.

The cadence with which the data bus varies between 8 and 9 data bits is based upon the code rate implemented by RLL encoder 328 in controller 314. This cadence is also illustratively programmably set in read/write channel 316 to match the controller code rate and force the same width requirements to both functional blocks 314 and 316 on each interface symbol in the sequence.

Figure 61:
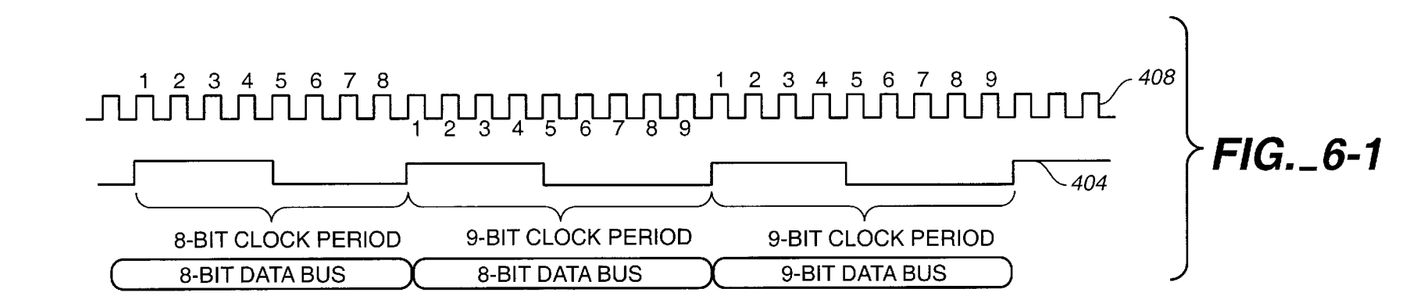

FIG. 6-1 shows an illustrative interface clock signal 404. Associated with each clock period is a number of data bits transferred on data bus 334 during that interface clock period. During the first clock and second clock periods of clock signal 404, the data bus is 8 bits wide. During the third clock period, the data bus is 9 bits wide. While cadence shown is one 9-bit data transfer every third clock cycle, this cadence will illustratively conform to a predetermined periodic cadence based on the code rate being used. Since formatter 322 is responsible for packing or unpacking and transferring data across interface 402, the formatter implements the predetermined cadence and thus switches the data bus accordingly.

FIG. 6-1 also illustrates a channel clock signal 408, which corresponds to the frequency with which serial bit data is clocked from read/write channel 316 to disc media 106. Interface clock signal 404 is shown having a first period equal to 8 cycles of channel clock 408, followed by a second period and a third period that have each been stretched to a period of 9 cycles of channel clock 408. Whenever data bus 334 is 9 bits wide, the interface clock period must be stretched by one cycle of channel clock 408. In addition, whenever parity generator 330 in read/write channel 316 inserts or removes a channel parity bit to or from the data stream, the interface clock period must be stretched by one cycle of channel clock 408, which may be in addition to a clock stretch associated with a 9-bit data transfer across data bus 334.

Figure 62:
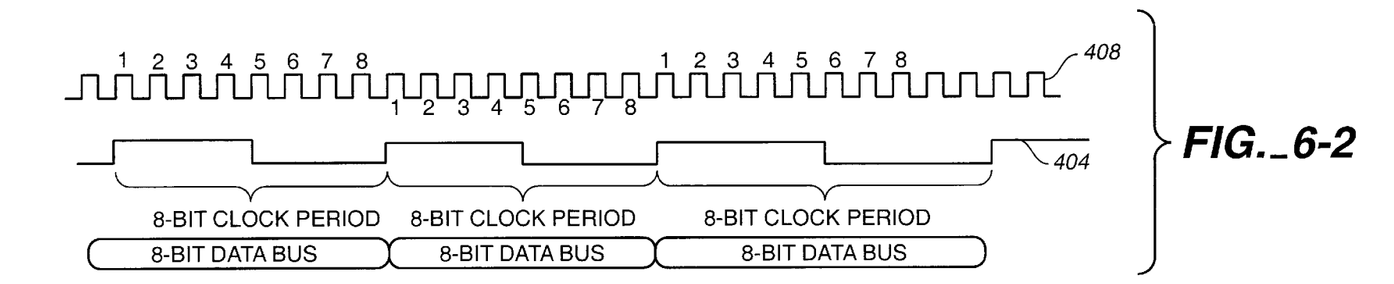

FIG. 6-2 illustrates this relationship among channel clock signal 408, interface clock signal 404, and the width of data bus 334. In this embodiment, formatter 322 is illustratively programmed to count media symbols (bytes), allowing accurate representation of the track format in units of media bytes.

However, because read/write circuit 316 is adding parity and/or RLL bits to the data to be written to disc media 106, and because the data bit rate into read/write circuit 316 is equal to the data bit rate out of the read/write circuit 316, user data will accumulate in read/write circuit 316 during a write operation. Therefore, this configuration requires that buffer 402 (see FIG. 7) be provided in read/write channel 316. This method allows the controller greater time between write transfers to set up for a subsequent sector.

Figure 7:
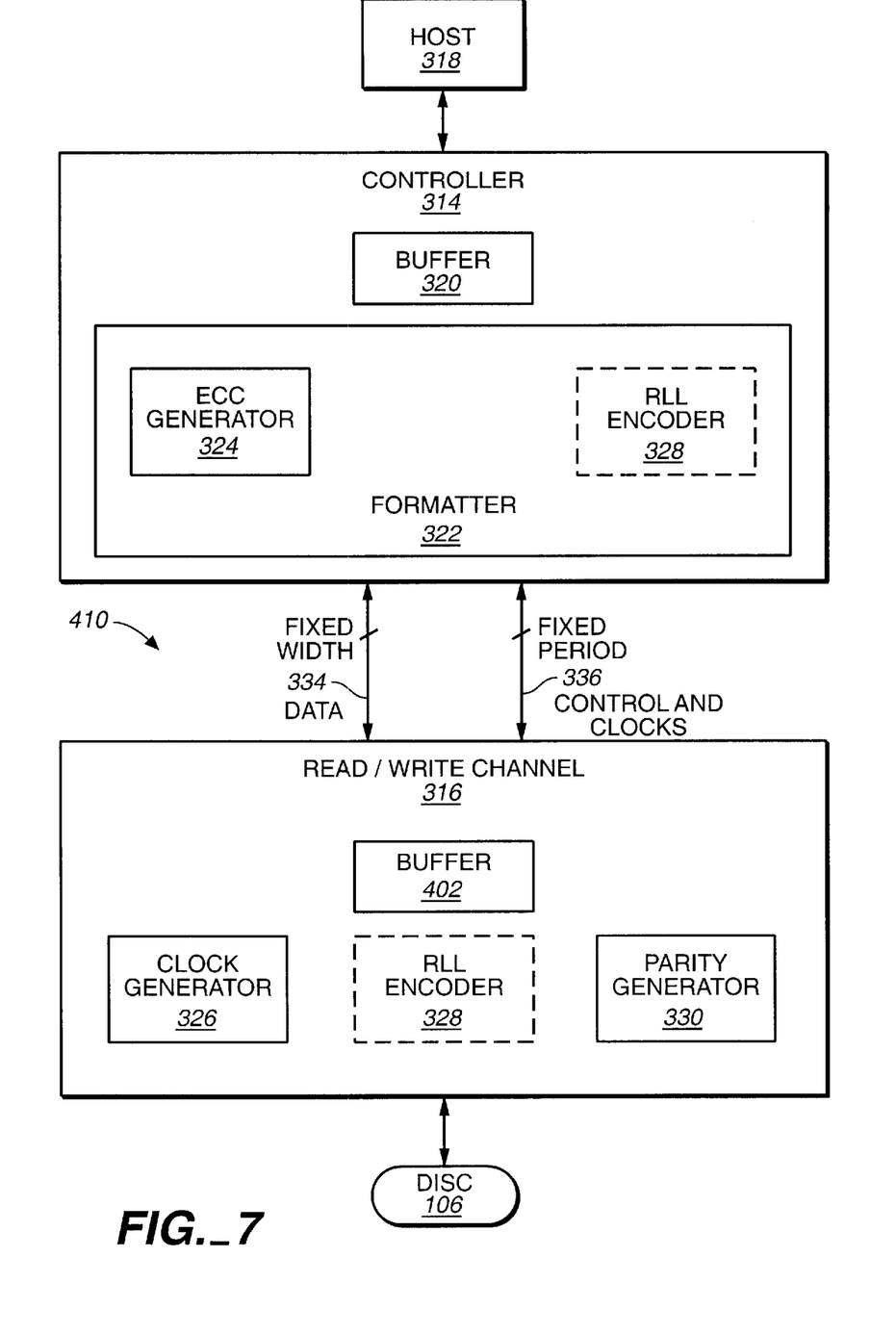
FIG. 7 is a block diagram illustrating another configuration of the channel-to-controller interface.
Figure 63:
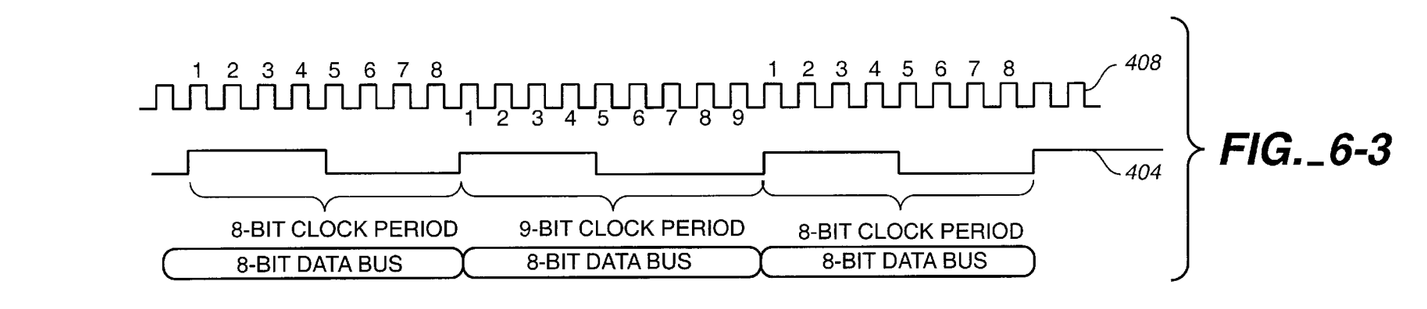
Figure 64:
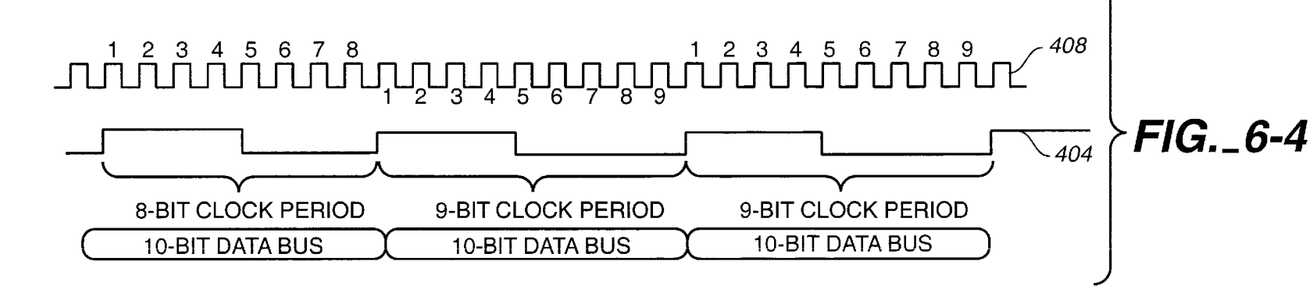
Figure 65:
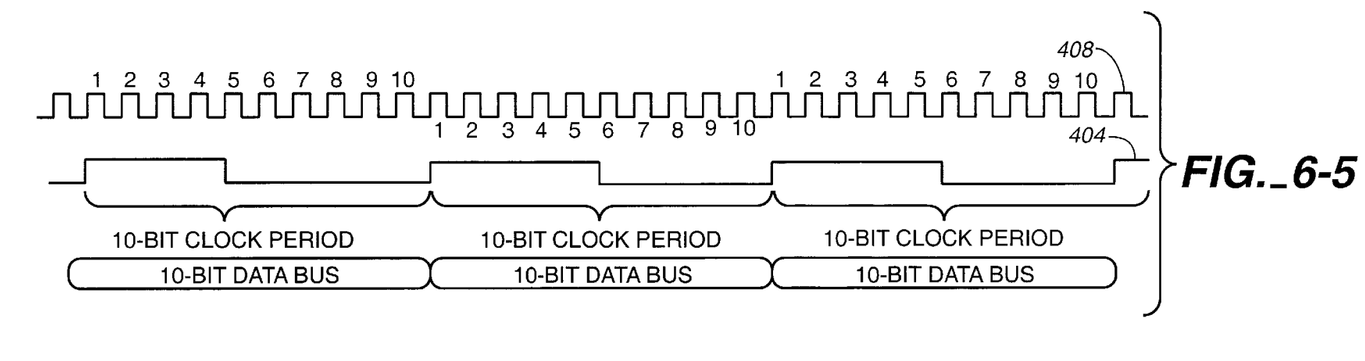

Another embodiment of the present invention is similar to that shown in FIG. 7, except that the clocking is different. The symbol width of channel-to-controller interface 410 is again fixed at 8 bits wide. Also, the interface clock is again sourced by clock generator 326 in read/write channel 316 for both read and write operations. However, in this embodiment, the interface clock signal has a period of either 8 or more channel bits. The base period is illustratively 8 channel bits, but the period is stretched (as illustrated with respect to clock signal 404 in FIG. 6-3) by one channel bit for each channel parity bit that is inserted or removed in the signal path by parity generator 330 in read/write channel 316, and by one channel bit for each RLL bit inserted or removed by RLL encoder 328 in controller 314 or in read/write channel 316. This clocking method allows formatter 322 and controller 314 to be programmed for clock timing with respect to user bytes. Again, the difference in data rate between the channel-to-media interface and the channel-to-controller interface is accommodated by speed matching buffer 402 in read/write channel 316.

However, because read/write circuit 316 is adding bits to the data to be written to disc media 106, and because the interface clock and the channel clock are fixed relative to one another and the interface clock corresponds to 8 channel bits, that means that the channel-to-controller interface data rate is higher than the channel-to-media data rate. Therefore, this requires that buffer 402 be provided on read/write channel 316. This allows the controller greater time between write transfers to set up for a subsequent sector.

Figure 8:
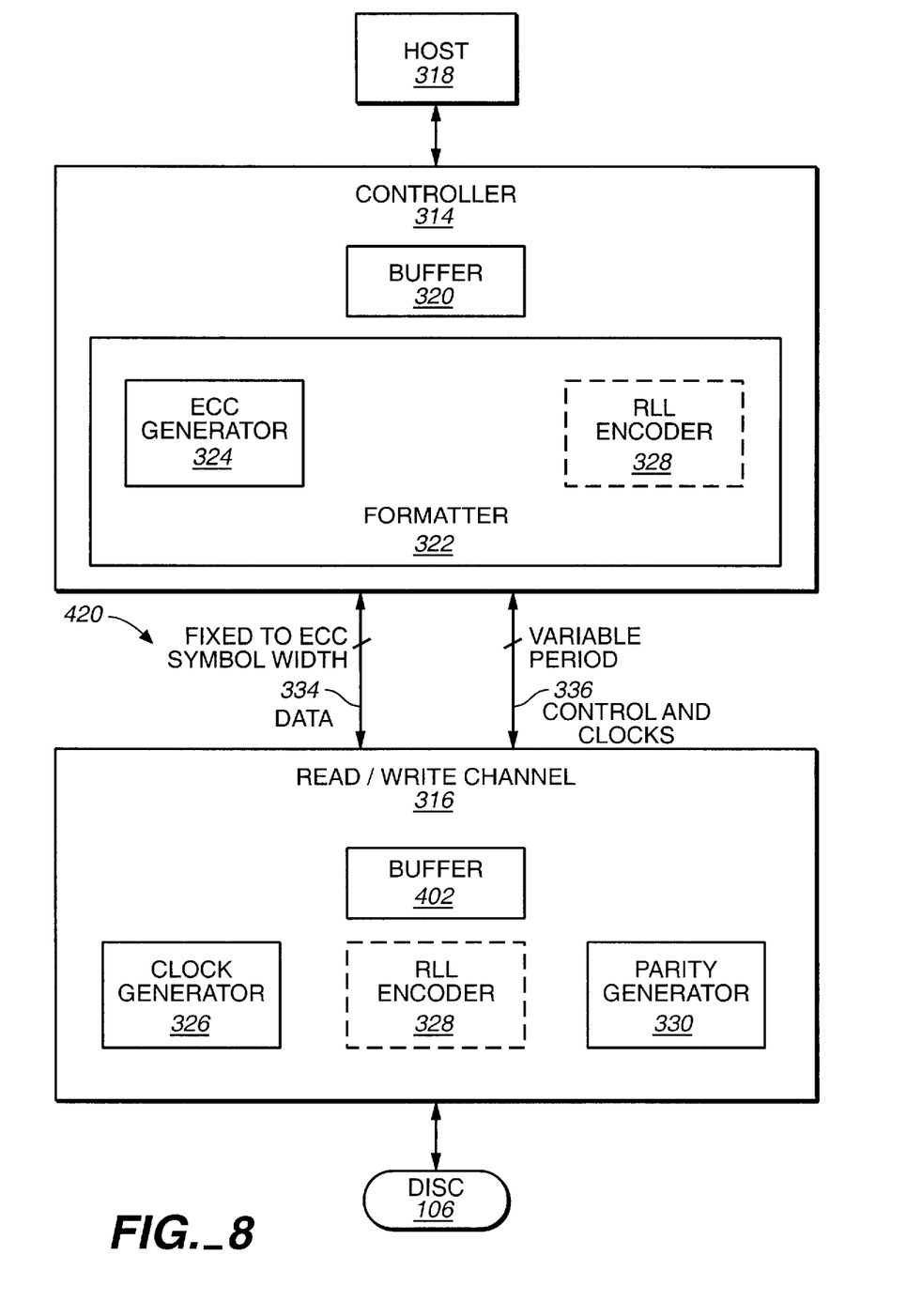
FIG. 8 is another block diagram illustrating other configurations of the channel-to-controller interface.

FIG. 8 illustrates an embodiment of another channel-to-controller interface 420 in accordance with another embodiment of the present invention. Similar items are similarly numbered to those shown in the previous Figures. It can be seen that controller 314 and read/write channel 316 are configured for either direct ECC/RLL mode or permuted ECC/RLL mode, with buffer 402 in read/write channel 316. In interface 420, data bus 334 has a fixed width, but it is fixed to the width of the ECC symbols generated by ECC generator 324 in the formatter 322 of controller 314. Such widths may illustratively be 8, 10 or 12 bits. The physical bus width illustratively matches the widest expected ECC symbol width.

As with the previous embodiments, the interface clock is sourced by clock generator 326 in read/write channel 316 for both read and write modes and has a variable period. The base period illustratively corresponds to 8 channel bits, but the period is stretched (as illustrated in FIG. 6-4) by one channel bit for each channel parity bit inserted or removed in the signal path by parity generator 330 in read/write channel 316, and by one channel bit for each RLL bit inserted or removed in the signal path by RLL encoder 328 in controller 314 or in read/write channel 316. This clocking allows the formatter 322 in controller 314 to be programmed to count user data bytes. Again, the difference in data rate between channel-to-media interface and the channel-to-controller interface is accommodated by speed matching buffer 402.

In this embodiment, since a major function of the formatter is to add ECC information to the data, this reduces the complexity of the formatter a great deal. Also, in one illustrative embodiment, the ECC technique is illustratively the known Reed Solomon technique and so data bus 334 is illustratively as wide as the widest expected Reed Solomon symbol.

Another embodiment in accordance with the present invention is similar to that shown with respect to FIG. 8, except that the clocking is different. In this embodiment, data bus 334 also has a fixed width, which is fixed to the width of the controller's ECC symbol. Again, the interface clock is illustratively sourced by clock generator 326 for both read and write modes. However, rather than being stretched, the interface clock has a period in channel bits equal to the ECC symbol width in bits. In other words, if the ECC symbol is 8, 10 or 12 bits wide, the interface clock period is 8, 10 or 12 channel clock bits, respectively (as illustrated in FIG. 6-5). This clocking allows controller-to-channel data transfer to occur in units that avoid bit padding. Again, the difference in data rate between the channel-to-media interface and the channel-to-controller interface is accommodated by speed matching buffer 402.

Yet another embodiment of the present invention is similar to that shown in FIG. 7 in that the data bus width is fixed and the interface clock has a similar base period. However, the interface clock period can be stretched. The data bus is illustratively fixed at 8 bits wide, as is the physical bus width. Again, the interface clock is sourced by clock generator 326 in read/write channel 316 for both read and write modes and has a period of either 8 or more channel bits. The base period illustratively corresponds to 8 channel bits, but can be stretched by one channel bit for each channel RLL, parity, or redundancy bit inserted or removed in the bit stream by read/write channel circuitry 316. This clocking allows the controller's track formatter 322 to be programmed in interface bytes. The data rate at the channel-to-media interface and channel-to-controller interface are thus identical, allowing easy implementation of the backward compatibility mode. The channel 316 may also illustratively stretch the interface clock cycle while source switching into and out of the read data recovery mode and/or over sync mark detection. However, the average clock rate while reading, writing and in idle is the same for format counting purposes.

It can thus be seen that the present invention provides a number of different embodiments or configurations of a channel-to-controller interface in which the data bus width and clocking are configured to accommodate one or more different operating modes.

The present invention includes a channel-to-controller interface (CCIF) 402, 410, 420 in a disc drive 100 having a disc 106 for receiving data during a write operation and providing access to data during a read operation. The data are transferred along a data path and is transferred to and from the disc 106 as serial data at a bit rate provided by a channel-to-media (CM) clock 408. The disc drive 100 further includes a disc drive controller 314 and a read/write (R/W) channel 316.

In one embodiment, the interface 402, 410, 420 includes a data bus 334 having interface symbols transferred thereover, and an interface clock 404 derived from the CM clock 408 and having a variable period, the period being varied based on bits added to or removed from the data along the data path by the R/W channel 316.

In one embodiment, the interface clock 404, 406 corresponds to an integer number of CM clock periods 408 and wherein the interface clock 404, 406 is stretched by one CM clock period each time a bit is added to or removed from the data by the R/W channel 316.

In another embodiment, R/W channel 316 includes a parity generator 330 which generates parity bits, or redundancy bits, and the interface clock 404, 406 is stretched by one CM clock period each time a bit is added to or removed from the data by the parity generator 330.

In another embodiment, R/W channel 316 includes an encoder 328 wherein encoder 328 adds bits to and removes bits from the data during write and read operations, respectively. The interface clock 404, 406 is stretched by one CM clock period 408 for each bit added or removed.

In another embodiment, controller 314 generates error correction code (ECC) symbols based on the data being transferred and wherein the data bus 334 is fixed to the width of the ECC symbols 312. In another embodiment, the interface clock period 404 is fixed based on a width of the ECC symbols.

In yet another embodiment, data is received by the disc drive controller in units having a user byte width and wherein the data bus is fixed to the user byte width. In still another embodiment, controller 314 includes a formatter 322 that generates the interface symbols with an interface symbol width based on redundancy and encoding functions performed along the data path, and wherein the data bus 334 is fixed to the interface symbol width.

In other embodiments, the disc drive controller 314 includes encoder 328, and the R/W channel 316 includes a speed matching buffer 402 in the data path.

In another embodiment, drive controller 314 includes encoder 328 and the data bus 334 has a variable width, the width being varied based on a code rate of the encoder 328. The data bus 334 varies in width according to a cadence determined by the disc drive controller 314 based on a code rate of encoder 328.

In one embodiment, the interface clock 406 varies by one CM clock period each time the data bus 334 changes width according to the cadence.

In another embodiment, the disc 106 has data stored thereon in media symbols, and wherein the interface symbol width is fixed to a media symbol width of the media symbols. In another embodiment, the period of the interface clock is fixed to a number of CM clock periods required to transfer a media symbol having the media symbol width.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the interface while maintaining substantially the same functionality without departing from the scope and spirit of the present invention.

What is claimed is:

1. A channel-to-controller interface (CCIF) in a disc drive having a disc for receiving data during a write operation and for providing access to data during a read operation, the data being transferred along a data path and being transferred to and from the disc as serial data at a bit rate provided by a channel-to-media (CM) clock, the disc drive further including a disc drive controller and a read/write (R/W) channel, the interface comprising:

a data bus having interface symbols transferred thereover; and an interface clock derived from the CM clock and having a variable period, the period being varied based on bits added to or removed from the data along the data path by the R/W channel.

2. The CCIF of claim 1 wherein the interface clock period corresponds to an integer number of CM clock periods and wherein the interface clock is stretched by one CM clock period each time a bit is added to or removed from the data by the R/W channel.

3. The CCIF of claim 2 wherein the R/W channel includes a parity generator that adds bits to and removes bits from the data and wherein the interface clock is stretched by one CM clock period each time a bit is added to or removed from the data by the parity generator.

4. The CCIF of claim 2 wherein the R/W channel adds and removes redundancy bits in the data and wherein the interface clock is stretched by one CM clock period each time a redundancy bit is added to or removed from the data.

5. The CCIF of claim 2 wherein the R/W channel includes an encoder and wherein the encoder adds bits to and removes bits from the data during write and read operations, respectively, and wherein the interface clock is stretched by one CM clock period for each bit added or removed.

6. The CCIF of claim 2 wherein the controller generates error correction (ECC) code symbols based on the data being transferred and wherein the data bus is fixed to a width of the ECC symbols generated.

7. The CCIF of claim 2 wherein data are received by the disc drive controller in units having a user byte width and wherein the data bus is fixed to the user byte width.

8. The CCIF of claim 2 wherein the disc drive controller includes a formatter that generates the interface symbols with an interface symbol width based on redundancy and encoding functions performed along the data path and wherein the data bus is fixed to the interface symbol width.

9. The CCIF of claim 1 wherein the disc drive controller includes an encoder and wherein the R/W channel includes a speed matching buffer in the data path.

10. The CCIF of claim 2 wherein the disc drive controller includes an encoder and wherein the data bus has a variable width, the width being varied based on a code rate of the encoder.

11. The CCIF of claim 10 wherein the data bus varies in width according to a cadence determined by the disc drive controller based on a code rate of the encoder.

12. The CCIF of claim 11 wherein the interface clock varies by one CM clock period each time the data bus changes width according to the cadence.

13. A channel-to-controller interface (CCIF) in a disc drive having a disc for receiving data during a write operation and for providing access to data during a read operation, the data being transferred along a data path and being transferred to and from the disc as serial data across a channel-to-media (CM) interface at a bit rate provided by a channel-to-media (CM) clock, the disc drive further including a disc drive controller and a read/write (R/W) channel, the interface comprising:

a data bus having interface symbols transferred thereover the interface symbols having a fixed symbol width; and an interface clock derived from the CM clock and having a fixed period, the R/W channel having a speed matching buffer to accommodate for mismatches in data transfer rates on the data bus and on the CM interface.

14. The CCIF of claim 13 wherein the controller generates error correction (ECC) code symbols based on the data being transferred and wherein the interface symbol width is fixed to a width of the ECC symbols generated.

15. The CCIF of claim 14 wherein the interface clock period corresponds to an integer number of CM clock periods and wherein the integer number of CM clock periods is based on a width of the ECC code symbols.

16. The CCIF of claim 13 wherein the disc has data stored thereon in media symbols, and wherein the interface symbol width is fixed to a media symbol width of the media symbols.

17. The CCIF of claim 16 wherein the fixed period of the interface clock is fixed to a number of CM clock periods required to transfer a media symbol having the media symbol width.

* * * * *

UNITED STATES PATENT AND TRADEMARK OFFICE
CERTIFICATE OF CORRECTION

PATENT NO. : 6,594,096 B2
DATED : July 15, 2003
INVENTOR(S) : Burns et al.

It is certified that error appears in the above-identified patent and that said Letters Patent is hereby corrected as shown below:

<u>Title page,</u>
Item [75], Inventors, "Kavi Alptekin" should be -- Alptekin Kavi --

Signed and Sealed this

Sixth Day of July, 2004

JON W. DUDAS
*Acting Director of the United States Patent and Trademark Office*